(12) United States Patent
Jang

(10) Patent No.: US 10,164,687 B2
(45) Date of Patent: Dec. 25, 2018

(54) NFC TAG RECOGNITION DEVICE AND NFC TAG RECOGNITION SYSTEM INCLUDING THE SAME

(71) Applicant: SAMSUNG ELECTRONICS CO., LTD., Suwon-si, Gyeonggi-do (KR)

(72) Inventor: Won Churl Jang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/590,031

(22) Filed: May 9, 2017

(65) Prior Publication Data
US 2018/0123645 A1 May 3, 2018

(30) Foreign Application Priority Data

Oct. 27, 2016 (KR) .......................... 10-2016-0140690

(51) Int. Cl.
| | |
|---|---|
| *H04B 5/00* | (2006.01) |
| *G06F 21/44* | (2013.01) |
| *G06F 21/35* | (2013.01) |
| *G06K 7/00* | (2006.01) |
| *G06K 7/10* | (2006.01) |
| *G06K 19/07* | (2006.01) |
| *H04W 12/06* | (2009.01) |

(52) U.S. Cl.
CPC ........... *H04B 5/0062* (2013.01); *G06F 21/35* (2013.01); *G06F 21/44* (2013.01); *G06K 7/0008* (2013.01); *G06K 7/10099* (2013.01); *G06K 7/10108* (2013.01); *G06K 19/0723* (2013.01); *H04W 12/06* (2013.01)

(58) Field of Classification Search
CPC ...... H04B 5/0031; H04B 5/0025; G06F 21/44
See application file for complete search history.

(56) References Cited

U.S. PATENT DOCUMENTS

| | | | |
|---|---|---|---|
| 6,624,743 B1 | 9/2003 | Ikefuji et al. | |
| 7,616,113 B2 * | 11/2009 | Ayachitula ............ | G01S 7/4021 340/539.13 |

(Continued)

FOREIGN PATENT DOCUMENTS

| | | |
|---|---|---|
| EP | 3103689 | 12/2016 |
| JP | 2001-291081 | 10/2001 |

(Continued)

*Primary Examiner* — Cindy Trandai
(74) *Attorney, Agent, or Firm* — Volentine, Whitt & Francos, PLLC

(57) ABSTRACT

An NFC tag recognition device includes an antenna responsive to signals transmitted by an NFC tag, a radio frequency (RF) signal processor measuring power of the signal received by the antenna from the NFC tag and converting the signal into digital data, an NFC controller extracting an authentication key from the digital data, an authentication signal processor generating an authentication pattern from the NFC tag, and an authentication signal storage storing an authentication key and an authentication pattern of a registered user. The authentication signal processor generates an authorization grant signal if the extracted authentication key matches the stored authentication key and the generated authentication pattern matches the stored authentication pattern.

20 Claims, 19 Drawing Sheets

(56) References Cited

U.S. PATENT DOCUMENTS

| | | | |
|---|---|---|---|
| 8,325,019 B2* | 12/2012 | Liu | G01S 11/06 |
| | | | 340/10.1 |
| 8,610,537 B2 | 12/2013 | Yamagiwa | |
| 8,798,809 B2 | 8/2014 | Kalhous et al. | |
| 8,825,222 B2 | 9/2014 | Namburu et al. | |
| 8,880,240 B2 | 11/2014 | Grimm et al. | |
| 8,947,530 B1 | 2/2015 | Scalisi | |
| 9,087,246 B1 | 7/2015 | Chin et al. | |
| 9,162,648 B1 | 10/2015 | Weng et al. | |
| 9,281,874 B2 | 3/2016 | Lefley | |
| 9,373,882 B2 | 6/2016 | McFarthing | |
| 2004/0079796 A1* | 4/2004 | Hull | G06F 17/30876 |
| | | | 235/375 |
| 2004/0095276 A1* | 5/2004 | Krumm | G01S 5/0252 |
| | | | 342/465 |
| 2006/0091221 A1* | 5/2006 | He | G06K 7/10851 |
| | | | 235/470 |
| 2007/0040687 A1* | 2/2007 | Reynolds | G01S 13/74 |
| | | | 340/572.7 |
| 2007/0073513 A1 | 3/2007 | Posamentier | |
| 2009/0308937 A1 | 12/2009 | Yagi et al. | |
| 2010/0233957 A1 | 9/2010 | Dobosz | |
| 2011/0050421 A1* | 3/2011 | Duron | G01S 13/589 |
| | | | 340/572.1 |
| 2012/0133487 A1 | 5/2012 | Murofushi | |
| 2013/0084801 A1* | 4/2013 | Royston | G06K 7/015 |
| | | | 455/41.1 |
| 2014/0002236 A1 | 1/2014 | Pineau et al. | |
| 2014/0115493 A1 | 4/2014 | Kim et al. | |
| 2014/0342670 A1* | 11/2014 | Kang | H04W 4/008 |
| | | | 455/41.2 |
| 2015/0028996 A1* | 1/2015 | Agrafioti | G06F 21/40 |
| | | | 340/5.82 |
| 2015/0163658 A1* | 6/2015 | Julian | H04L 67/24 |
| | | | 455/420 |
| 2015/0269799 A1 | 9/2015 | Martinez et al. | |
| 2015/0371521 A1* | 12/2015 | Braiman | G06K 7/10415 |
| | | | 340/10.1 |
| 2016/0007912 A1* | 1/2016 | Hu | A61B 5/002 |
| | | | 600/595 |
| 2016/0036965 A1* | 2/2016 | Kim | H04M 1/72577 |
| | | | 455/411 |
| 2016/0134450 A1 | 5/2016 | Kusakabe et al. | |
| 2016/0368455 A1 | 12/2016 | Kim et al. | |
| 2017/0039358 A1* | 2/2017 | Yuen | G06F 3/017 |
| 2017/0265785 A1* | 9/2017 | Vaughn | A61B 5/1123 |

FOREIGN PATENT DOCUMENTS

| | | |
|---|---|---|
| JP | 2010-238166 | 10/2010 |
| KR | 1480880 | 1/2015 |
| WO | WO 2015-119417 | 8/2015 |

* cited by examiner

NFC TAG RECOGNITION DEVICE AND NFC TAG RECOGNITION SYSTEM INCLUDING THE SAME

PRIORITY STATEMENT

This application claims priority to Korean Patent Application No. 10-2016-0140690, filed on Oct. 27, 2016, and all the benefits accruing therefrom under 35 U.S.C. § 119, the disclosure of which is hereby incorporated by reference in its entirety.

BACKGROUND

1. Field

The inventive concept relates to devices and systems employing near-field communication (NFC) technology to exchange information. In particular, the inventive concept relates to devices and control systems having a security capability or function enabled by a near-field communication (NFC) protocol.

2. Description of the Related Art

Near-field communication (NFC) is a wireless communication protocol using a high frequency of 13.56 MHz. NFC enables data communication between terminals of electronic devices when one of the devices is placed in contact with or brought close to another of the devices. NFC is especially applicable to mobile devices, particularly, smartphones. NFC is also compatible with non-contact systems such as smart cards and other wireless connections.

NFC readers, which are employed by mobile devices such as smartphones, tablet personal computers (PCs), and the like, have a chip-type NFC circuit embedded therein for NFC communication with external devices, such as smart cards, having NFC tags.

SUMMARY

According to the inventive concept, there are provided near-field communication (NFC) tag recognition devices comprising at least one antenna, a radio frequency (RF) signal processor operatively connected to the at least one antenna and configured to measure power of an RF signal received by the at least one antenna from an external device comprising an NFC tag and convert the RF signal into digital data, an NFC controller operatively connected to the RF signal processor and configured to extract an authentication key from the digital data generated by the RF signal processor, an authentication signal processor configured to generate data of an authentication pattern by calculating the distance between the NFC tag and a reference point and changes in the distance using power measurements produced by the RF signal processor, and an authentication signal storage configured to store an authentication key and data of an authentication pattern of a user. The authentication signal processor is operatively connected to the authentication signal storage such that an authentication key and data of an authentication pattern stored in the authentication signal storage are accessible by the authentication signal processor. Also, the authentication signal processor is configured to compare the authentication key extracted by the NFC controller with an authentication key stored in the authentication signal storage, to compare the data of the authentication pattern generated by the authentication signal processor with data of an authentication pattern stored in the authentication signal storage, and to generate an authorization grant signal if, at a minimum, both the authentication key extracted by the NFC controller matches the authentication key stored in the authentication signal storage and the data of the authentication pattern generated by the authentication signal processor corresponds to the data of the authentication pattern stored in the authentication signal storage.

According to the inventive concept, there are also provided near-field communication (NFC) tag recognition devices including first through fourth antennas receiving a signal of an NFC tag, an RF signal processor measuring first through fourth reception sensitivities of the first through fourth antennas for the signal of the NFC tag and converting the signal of the NFC tag into digital data, an NFC controller generating a response signal for the digital data, and an authentication signal processor calculating a location of the NFC tag and an amount of variation in the location of the NFC tag using the measured first through fourth reception sensitivities.

According to the inventive concept, there are also provided near-field communication (NFC) tag-based recognition systems comprising at least one NFC tag that emits an RF signal, and an NFC tag recognition device configured to generate an authentication pattern by computing changes in locations of each said at least one NFC tag relative to the device, and in which the NFC tag recognition device includes at least one antenna responsive to the RF signal emitted by each said at least one NFC tag, a radio frequency (RF) signal processor operatively connected to the at least one antenna and configured to measure power of an RF signal received by each said at least one antenna from said at least one NFC tag and convert the RF signal into digital data, an NFC controller operatively connected to the RF signal processor and configured to generated a response signal based on digital data generated by the RF signal processor, an authentication signal processor operatively connected to the RF signal processor and configured to generate an authentication pattern by calculating a distance between a reference point and each said at least one NFC tag and changes in the distance between the reference point and each said at least one NFC tag using power measurements produced by the RF signal processor, an authentication signal storage configured to store an authentication pattern of a user, and a system controller operatively connected to the authentication signal processor to generate a control signal when an authorization grant signal is generated by the authentication signal processor. The authentication signal processor is operatively connected to the authentication signal storage such that an authentication pattern stored in the authentication signal storage is accessible by the authentication signal processor. Also, the authentication signal processor is configured to compare an authentication pattern generated by the authentication signal processor with an authentication pattern stored in authentication signal storage and is operative to generate the authorization grant signal if, at a minimum, the authentication pattern generated by the authentication signal processor corresponds to the authentication pattern stored in authentication signal storage.

According to the inventive concept, there are also provided near-field communication (NFC) control system comprising at least one NFC tag that emits a radio frequency (RF) signal, a device or product including a lock capable of assuming a locked state in which the device or product is inaccessible to a user and an unlocked state in which the device or product is accessible to a user, at least one antenna responsive to the RF signal emitted by each said at least one NFC tag, a radio frequency (RF) signal processor operatively connected to the at least one antenna and configured to measure strength of an RF signal received by each said at least one antenna from said at least one NFC tag and convert the RF signal into digital data representative of the measured strength, an NFC controller operatively connected to the RF signal processor and configured to generated a response signal based on digital data generated by the RF signal processor, an authentication signal processor operatively connected to the RF signal processor, configured to generate data of an authentication pattern representative of relative motion between each said at least one NFC tag and the at least one antenna, and operative to generate an authorization signal, an authentication signal storage configured to store data of an authentication pattern, and a system controller operatively connected to the authentication signal processor to generate a lock control signal when the authorization signal is generated by the authentication signal processor. The authentication signal processor is operatively connected to the authentication signal storage such that the data of the authentication pattern stored in the authentication signal storage is accessible by the authentication signal processor. The authentication signal processor is configured to compare the data of an authentication pattern generated by the authentication signal processor with the data of an authentication pattern stored in authentication signal storage and is operative to generate the authorization signal if, at a minimum, the data of the authentication pattern generated by the authentication signal processor corresponds to the data of the authentication pattern stored in authentication signal storage. Also, the lock is electronically controllable and is operatively connected to the system controller so as to change states from one of the locked and unlocked states to the other of the locked and unlocked states when the system controller generates the lock control signal.

Other features and examples of the inventive concept, and benefits and advantages thereof, will be apparent from the following detailed description, the drawings, and the claims.

BRIEF DESCRIPTION OF THE DRAWINGS

The above and other advantages and features of the inventive concept will become more apparent by describing in detail examples thereof with reference to the attached drawings, in which.

DETAILED DESCRIPTION

Figure 1:
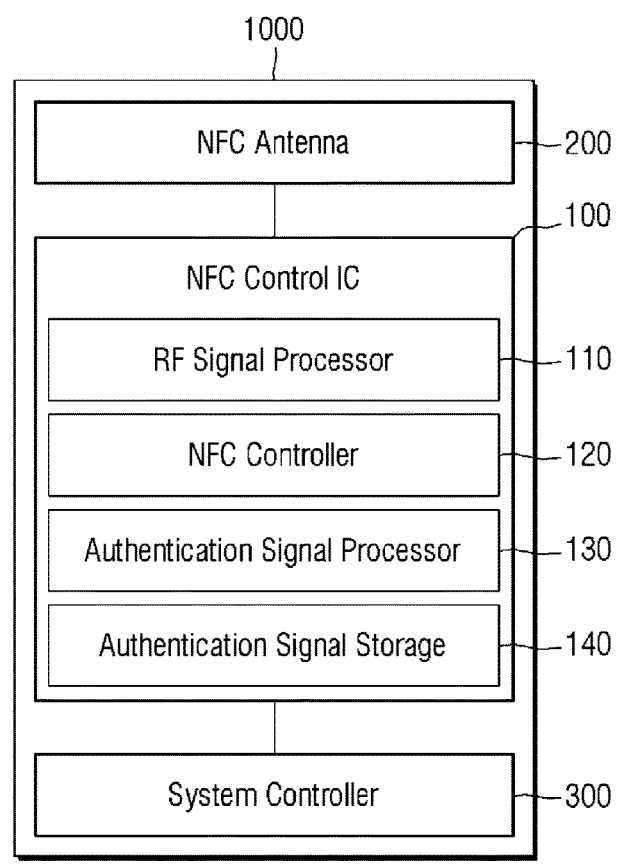
FIG. 1 is a block diagram of a near-field communication (NFC) tag recognition device according to an example of the inventive concept.

As is traditional in the field of the inventive concept, examples of the inventive concept are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the various examples disclosed herein may be physically separated into two or more interacting and discrete blocks, units and/or modules without departing from the scope of the inventive concept. Furthermore, the blocks, units and/or modules of the embodiments may be physically combined into more complex blocks, units and/or modules without departing from the scope of the inventive concept.

In a conventional security system using a near-field communication (NFC) protocol, authentication information of a user, e.g., an authentication key, is exchanged between an NFC lock and an NFC storage medium comprising an NFC tag serving as a key to the NFC lock. If the authentication information is determined to be valid, the NFC lock is unlocked. In short, conventional NFC-based security systems simply exchange authentication information and provide access rights by verifying the authentication information. Thus, the conventional NFC-based security systems are highly vulnerable in a case in which an NFC storage medium comprising an NFC tag is stolen or copied.

To address this and other problems, recent security systems may also use biometric recognition (such as fingerprint recognition, iris recognition, and face recognition), which, however, requires the addition of high-end biometric recognition equipment and thus leads to an increase in manufacturing cost.

According to an aspect of the inventive concept there are provided NFC tag recognition devices capable of authenticating the identity of a user by identifying the motion of a user who employs an NFC tag. The NFC tag recognition device determines locations of the NFC tag, discerns from the locations the pattern of the motion of the NFC tag, and compares the pattern with a previously-registered user pattern. If the pattern matches the previously-registered user pattern, the NFC tag recognition device operates an NFC lock. The NFC tag recognition device may also verify an authentication key stored in the NFC tag.

The NFC tag recognition device according to the inventive concept can provide a higher security function than a conventional NFC security system. Also, the NFC tag recognition device according to the inventive concept can be adopted for use with existing security equipment and can thus lower manufacturing cost.

In the meantime, various virtual reality (VR) devices using VR and augmented reality (AR) techniques have been provided. To use various services in a VR space, techniques are needed for controlling the location of an object in a VR space.

There are largely three conventional methods of controlling the location of an object in a VR space: a method of converting the location of a hand of a person, measured with a camera and a computer vision technique, into location information in a VR space; a method of converting location information of a device, obtained using a gyro-sensor provided in the device, into location information in a VR space; and a method of using motion information of a device equipped with a laser sensor as location information in a VR space.

These conventional methods, especially those involving the use of a camera, are susceptible to variations in an external environment (such as the presence of sunlight and lightings) and are thus often inaccurate. Also, these conventional methods require the use of relatively expensive equipment such as a camera, a gyro-sensor, a laser sensor, or the like, which generally lacks portability, is difficult to be controlled sophisticatedly, and cannot provide an authentication function independently.

The NFC tag recognition device according to the inventive concept can extract three-dimensional (3D) location information using existing equipment. Also, the NFC tag recognition device according to the inventive concept is robust against external noise and can thus precisely measure location. Also, since the NFC tag recognition device according to the inventive concept can verify the validity of a user based on an authentication pattern consisting of 3D location information, the NFC tag recognition device according to the inventive concept can provide a high security function.

An NFC tag recognition device and an NFC tag-based recognition system including the same, according to some examples of the inventive concept, will be described hereinafter with reference to FIGS. 1 through 19.

FIG. 1 is a block diagram of a NFC tag recognition device according to an example of the inventive concept.

Referring to FIG. 1, an NFC tag recognition device 1000 includes an NFC control integrated circuit (IC) 100, an antenna 200, and a system controller 300.

The NFC control IC 100 includes a radio frequency (RF) signal processor 110, an NFC controller 120, an authentication signal processor 130, and an authentication signal storage medium 140 operatively connected to one another.

The elements of the NFC tag recognition device 1000 may be implemented as separate chips, modules or devices and may be embedded in a single device. For example, the NFC control IC 100 and the system controller 300 may be integrated into a single chip, but the inventive concept is not limited thereto.

The antenna 200 may receive a signal from an NFC tag. Although not specifically illustrated in FIG. 1, the NFC tag recognition device 1000 may include more than one antenna. That is, the NFC tag recognition device 1000 may include only one antenna, two antennas, four antennas, or nine antennas, but the inventive concept is not limited thereto.

In a case in which only one antenna is provided in the NFC tag recognition device 1000, the NFC tag recognition device 1000 may use an authentication pattern, which is based on a distance from the NFC tag and a variation in the distance from the NFC tag. On the other hand, in a case in which three or more antennas are provided in the NFC tag recognition device 1000, the NFC tag recognition device 1000 may use a 3D authentication pattern, which is based on 3D coordinates of the NFC tag and variations in the 3D coordinates of the NFC tag. The type of authentication pattern used by the NFC tag recognition device 1000 will be described later in more detail.

The RF signal processor 110 may measure the received power of the signal of the NFC tag, received by the antenna 200, and may convert the signal of the NFC tag into digital data. More specifically, the RF signal processor 110 may measure the strength or the received power of an RF signal of the NFC tag and may convert the RF signal into digital data. Also, the RF signal processor 110 may convert analog data received from the NFC tag into digital data. An NFC wireless communication protocol enables bidirectional data communication between the NFC tag and an NFC reader.

The NFC controller 120 receives the digital data from the RF signal processor 110. The NFC controller 120 may interpret and extract raw data from the digital data. For example, the NFC controller 120 may extract data including an operation request command or authentication information (for example, an authentication key) from the signal of the NFC tag. Then, the NFC controller 120 may transmit a response signal for the operation request command to the NFC tag via the RF signal processor 110 and the antenna 200. Also, the NFC controller 120 may transmit the extracted data and the measured received power of the signal of the NFC tag to the authentication signal processor 130.

The authentication signal processor 130 may analyze the extracted data, received from the NFC controller 120, and may compare an authentication key transmitted by the NFC tag with an authentication key of a registered user.

Also, the authentication signal processor 130 may generate data of an authentication pattern representative of relative motion between the NFC tag and the antenna 200. In particular, the authentication signal processor 130 may calculate a distance of the NFC tag recognition device 1000 from the NFC tag based on the received power of the signal of the NFC tag and may generate an authentication pattern by calculating the magnitude of changes in the distance of the device 1000 from the NFC tag.

In general, an RF device using NFC technology is based on the principle that there exists a location where the received power of a signal is maximized and the received power of the RF signal gradually decreases away from that location. According to this principle, the distance between the NFC tag recognition device 1000 and the NFC tag may be determined by measuring the received power of an NFC signal of the NFC tag. The NFC tag recognition device 1000 and the NFC tag may continue to exchange NFC signals with each other until the NFC tag is moved a certain distance from the NFC tag recognition device 1000. The NFC tag recognition device 1000 may measure the received power of a signal received from the NFC tag and may measure the distance from the NFC tag in real time. If a user moves the NFC tag away from the NFC tag recognition device 1000, the NFC tag recognition device 1000 may measure the magnitude of the change in the distance of the device 1000 from the NFC tag and may generate an authentication pattern based on the result of the measurement.

Subsequently, the authentication signal processor 130 may compare the generated authentication pattern with an authentication pattern of the registered user.

If the extracted authentication key matches the authentication key of the registered user and the generated authentication pattern matches the authentication pattern of the registered user, the authentication signal processor 130 may generate an authorization grant signal that drives an NFC lock to, for example, lock or unlock the NFC lock. In this regard, the term "match", especially with respect to the authentication patterns, may leave room for minor differences within certain tolerances. Therefore, it may be considered that the authentication signal processor 130 may generate an authorization grant signal when the generated authentication pattern corresponds to the authentication pattern of the registered user. The authentication signal processor 130 may transmit the authorization grant signal to the system controller 300.

The authentication signal storage medium 140 stores the authentication key and the authentication pattern of the registered user. In a case in which there exists a request from the authentication signal processor 130, the authentication signal storage 140 provides the authentication key and the authentication pattern of the registered user to the authentication signal processor in response to the request from the authentication signal processor 130.

The system controller 300 may control access to the NFC lock of, for example, a door, a notebook computer, a tablet PC, or the like. For example, in response to the authorization grant signal being received from the authentication signal processor 130, the system controller 300 drives the NFC lock. On the other hand, in response to an authorization non-grant signal being received from the authentication signal processor 130, the system controller 300 maintains a current state of the NFC lock.

Figure 2:
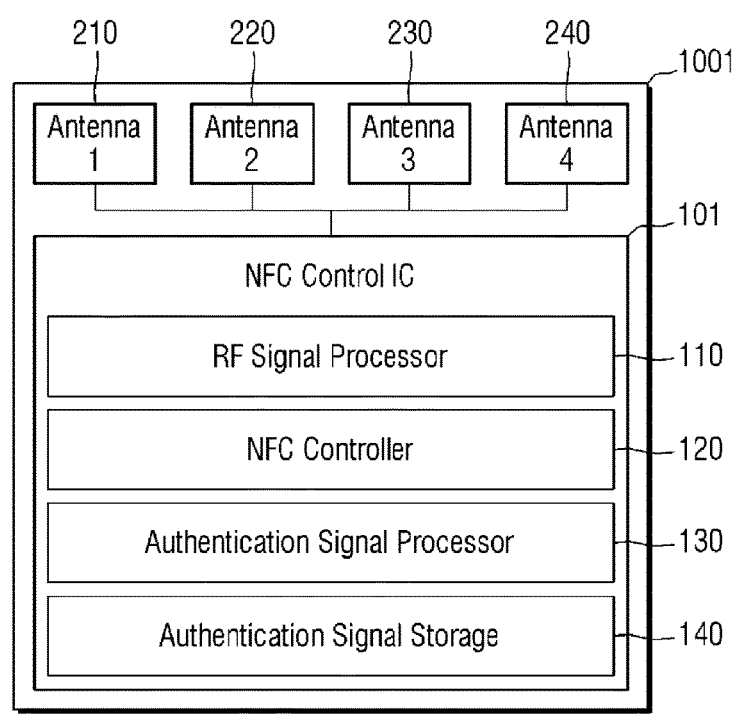
FIG. 2 is a block diagram of an NFC tag recognition device according to another example of the inventive concept.

FIG. 2 is a block diagram of an NFC tag recognition device according to another example of the inventive concept. For convenience, the present example will hereinafter be described, focusing mainly on differences with the previous example to avoid any redundant descriptions.

Referring to FIG. 2, an NFC tag recognition device 1001 includes an NFC control IC 101 and a plurality of antennas (210, 220, 230, and 240). The NFC control IC 101 may operate substantially in the same manner as the example of FIG. 1.

The NFC tag recognition device 1001 may include, for example, four antennas, i.e., first, second, third, and fourth antennas 210, 220, 230, and 240. The NFC control IC 101 may receive signals from the four antennas 201 through 204 at the same time, but the inventive concept is not limited thereto.

Although not specifically illustrated in FIG. 2, the NFC control IC 101 may include a plurality of antenna terminals and may simultaneously process multiple signals received at the same time via the antennas 201 through 204.

The NFC control IC 101 may calculate 3D coordinates of an NFC tag using the powers of signals received from the NFC tag via the antennas 201 through 204. Also, the NFC control IC 101 may derive a 3D authentication pattern using variations in the 3D coordinates of the NFC tag.

Figure 3:
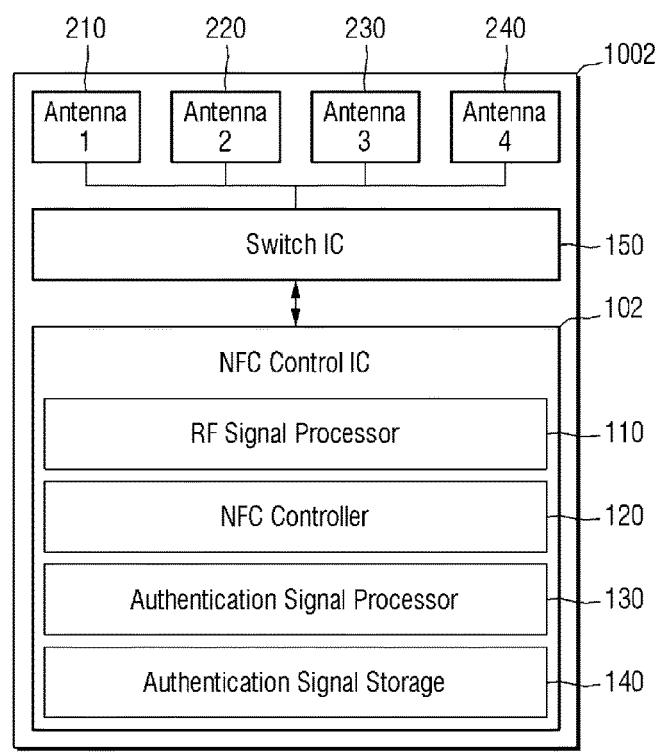
FIG. 3 is a block diagram of an NFC tag recognition device according to another example of the inventive concept.

FIG. 3 is a block diagram of an NFC tag recognition device according to another example of the inventive concept. For convenience, the present example will hereinafter be described, focusing mainly on differences with the previous examples to avoid any redundant descriptions.

Referring to FIG. 3, an NFC tag recognition device 1002 includes an NFC control IC 102, a switch IC 150, and a plurality of antennas (210, 220, 230, and 240). The NFC control IC 102 may operate substantially in the same manner as the example of FIG. 1.

The NFC tag recognition device 1002 may include, for example, four antennas, i.e., first through fourth antennas 201 through 204. The NFC control IC 102 may either sequentially receive signals from the first through fourth antennas 201 through 204 or receive signals obtained by time-dividing the signals received from the first through fourth antennas 201 through 204, but the inventive concept is not limited thereto.

Although not specifically illustrated in FIG. 3, the NFC control IC 102 of this example includes only one antenna terminal and thus is not be able to simultaneously process multiple signals received at the same time via the first through fourth antennas 201 through 204.

In this case, the signals received at the same time via the first through fourth antennas 201 through 204 may be transmitted to the NFC control IC 102 via the switch IC 150. Because the NFC control IC 102 includes only one antenna terminal, the switch IC 150 may either sequentially provide the signals received at the same time via the first through fourth antennas 201 through 204 or provide time-divided signals to the NFC control IC 102, but the inventive concept is not limited thereto.

The NFC control IC 102 may calculate 3D coordinates of an NFC tag using the powers of signals received from the NFC tag via the first through fourth antennas 201 through 204. Also, the NFC control IC 102 may derive a 3D authentication pattern using variations in the 3D coordinates of the NFC tag.

Figure 4:
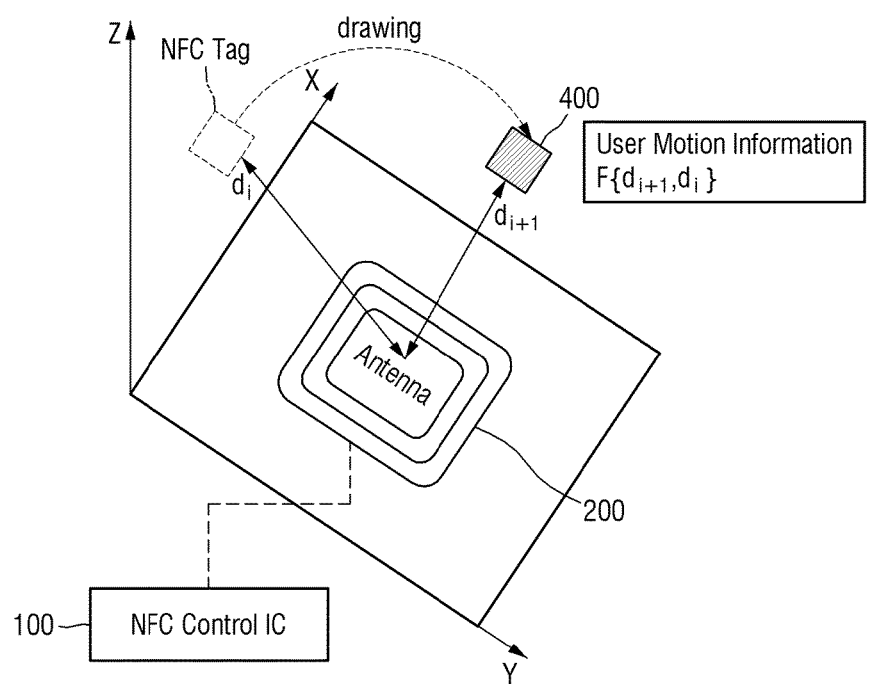
FIG. 4 is a conceptual diagram illustrating an operation of an NFC tag-based recognition system according to an example of the inventive concept.
Figure 5:
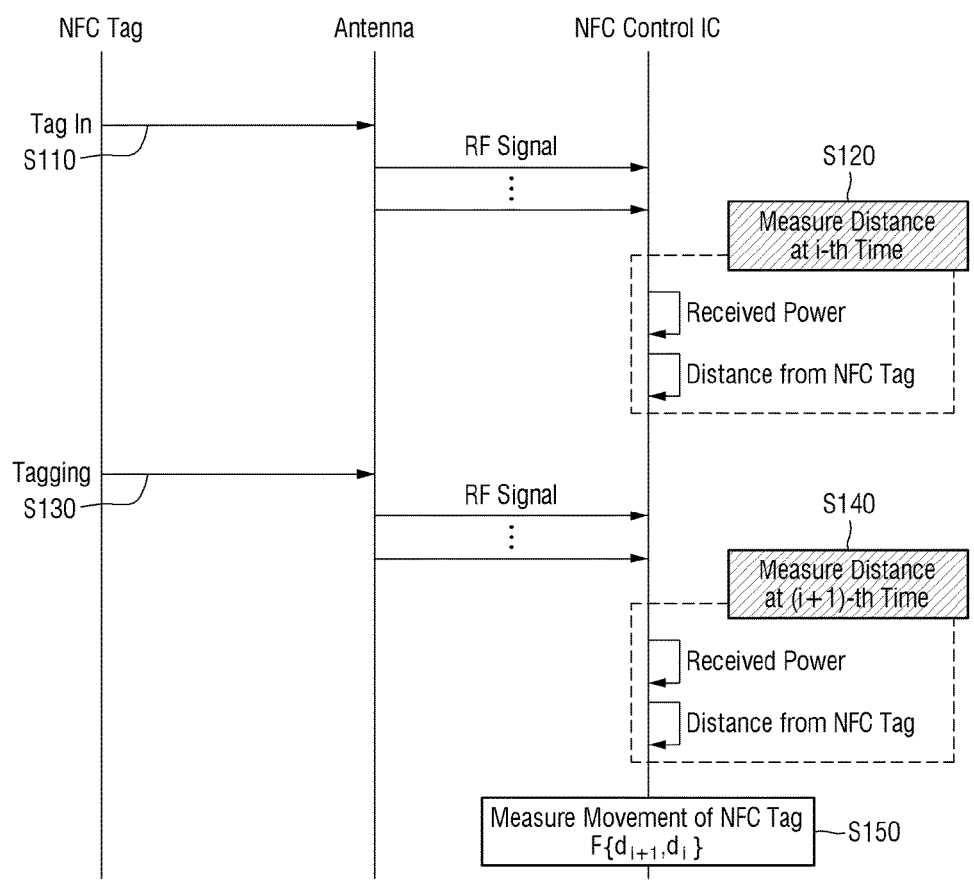
FIG. 5 is a flowchart illustrating methods of measuring the distance between an NFC tag recognition device and an NFC tag and of measuring the motion of the NFC tag, according to an example of the inventive concept.

FIG. 4 illustrates principles of operation of an NFC tag-based recognition system according to an example of the inventive concept. FIG. 5 is a flowchart illustrating processes of measuring the distance between an NFC tag recognition device and an NFC tag of the system and of discerning the motion of the NFC tag, according to an example of the inventive concept.

Referring to FIGS. 4 and 5, the NFC tag-based recognition system according to the present example may include an NFC control IC 100, an antenna 200, and an NFC tag 400. The NFC control IC 100 and the antenna 200 may operate substantially in the same manners as their respective counterparts of the example of FIG. 1.

For convenience, only one antenna 200 is illustrated in FIGS. 4 and 5, but the inventive concept is not limited thereto. The NFC tag-based recognition system according to the present example may use a plurality of antennas, in which case, the precision of the recognition of the location of the NFC tag may be improved.

The NFC tag 400 may perform bidirectional data communication with the NFC control IC 100 in a non-contact manner via the antenna 200.

In response to the NFC tag 400 being tagged in a NFC tag recognition device including the NFC control IC 100 and the antenna 200, the antenna 200 receives an NFC signal (for example, an RF signal having a predetermined frequency) (S110). The antenna 200 transmits the received NFC signal to the NFC control IC 100.

Subsequently, the NFC control IC 100 calculates a first distance d1 of a reference point from the NFC tag 400 based on the received power of an NFC signal received at a first time t1 (S120). More specifically, an RF signal processor 110 of the NFC control IC 100 measures the received power of a signal of the NFC tag 400 at the time t1. An authentication signal processor 130 of the NFC control IC 100 calculates the first distance d1 based on the received power measured at the time t1.

Subsequently, the NFC tag 400 is moved while still being tagged in the NFC tag recognition device (S130).

Subsequently, the NFC control IC 100 calculates a second distance of a reference point from the NFC tag 400 based on the received power of an NFC signal received at a second time t2 (S140). The RF signal processor 110 of the NFC control IC 100 measures the received power of the signal of the NFC tag 400 at the time t2. The authentication signal processor 130 calculates the second distance d2 based on the received power measured at the time t2.

Subsequently, the authentication signal processor 130 of the NFC control IC 100 generates an authentication pattern based on the difference between the first and second times t1 and t2 and the difference between the first and second distances d1 and d2 (S150). In this example in which the NFC recognition device has a single antenna 200, the reference point for measuring the distances may lie on the antenna 200.

That is, the NFC control IC 100 may compute, i.e., quantify, the motion of the NFC tag 400 by calculating the amount of variation between an i-th distance d1 and an (i+1)-th distance d1+1, i.e., F{di+1, di} (where F denotes a function of measuring the variation of a motion), while measuring the distance from the NFC tag 400 in real time. In this manner, the NFC control IC 100 may generate an authentication pattern corresponding to the motion of the NFC tag 400. The generated authentication pattern may be compared with the authentication pattern stored in the authentication signal storage 140 to determine whether it is a match for the authentication pattern stored in the authentication signal storage 140.

Figure 6:
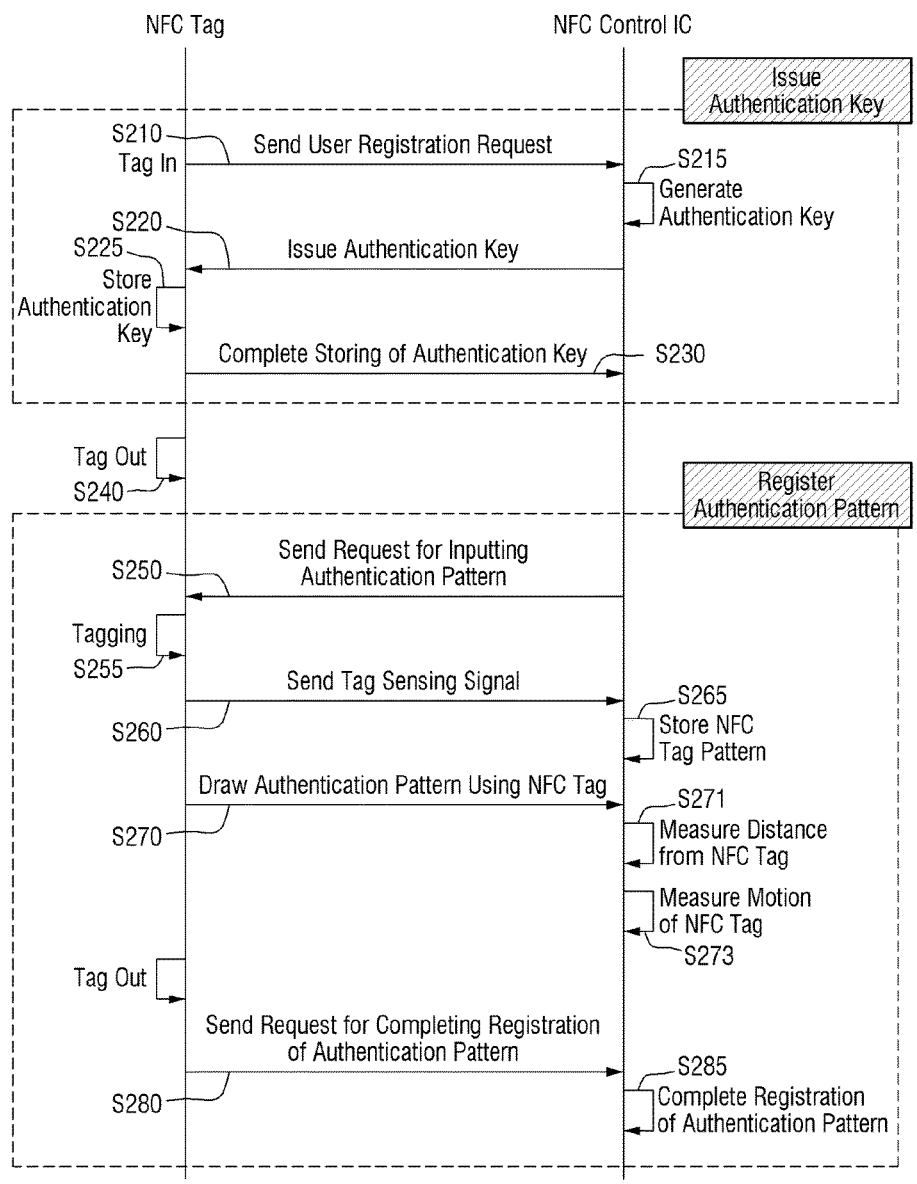
FIG. 6 is a flowchart illustrating an authentication pattern registration process of an NFC tag-based recognition system according to an example of the inventive concept.

FIG. 6 is a flowchart illustrating an authentication pattern registration process of an NFC tag-based recognition system according to an example of the inventive concept.

Referring to FIG. 6, to register a new user with an NFC tag recognition device 1000, an authentication key of the new user needs to be installed in an NFC tag 400, and an authentication pattern of the new user needs to be stored in the NFC tag recognition device 1000.

To install a new authentication key, the NFC tag 400 is tagged in the NFC tag recognition device 1000, and a user registration request is sent to an NFC control IC 100 (S210).

Subsequently, in response to the user registration request being received, an authentication signal processor 130 of the NFC control IC 100 generates a new authentication key (S215). An authentication signal storage 140 stores the generated authentication key.

Subsequently, an RF signal processor 110 transmits the generated authentication key to the NFC tag 400, and the NFC tag 400 stores the generated authentication key (S225). Subsequently, the NFC tag 400 transmits a response signal indicating that the storing of the generated authentication key is complete to the NFC control IC 100 (S230). In this manner, the issuance of the new authentication key is completed.

Subsequently, once the new authentication key is issued, the NFC tag recognition device 1000 requests a new authentication pattern to be input to the NFC tag 400 (S250).

Subsequently, if the NFC tag 400 is tagged in the NFC tag recognition device 1000 (S255) and transmits a tag sensing signal to the NFC control IC 100 (S260), the NFC control IC 100 begins to calculate and store an authentication pattern (S265).

Subsequently, the NFC tag 400 is manipulated to "draw" an authentication pattern over the NFC tag recognition device 1000 (S270). The NFC control IC 100 measures the distance from the NFC tag 400 in real time (S271) and generates a new authentication pattern by computing motion information of the NFC tag 400 by computing motion information of the NFC tag 400 based on the result of the measurement (S273).

Subsequently, the NFC tag 400 is tagged out of the NFC tag recognition device 1000 and at the same time, requests the registration of the generated authentication pattern to be completed (S280).

Subsequently, the NFC control IC 100 registers the generated authentication pattern with the authentication signal storage 140 (S285). In this manner, the registration of the new authentication pattern is completed.

Figure 7:
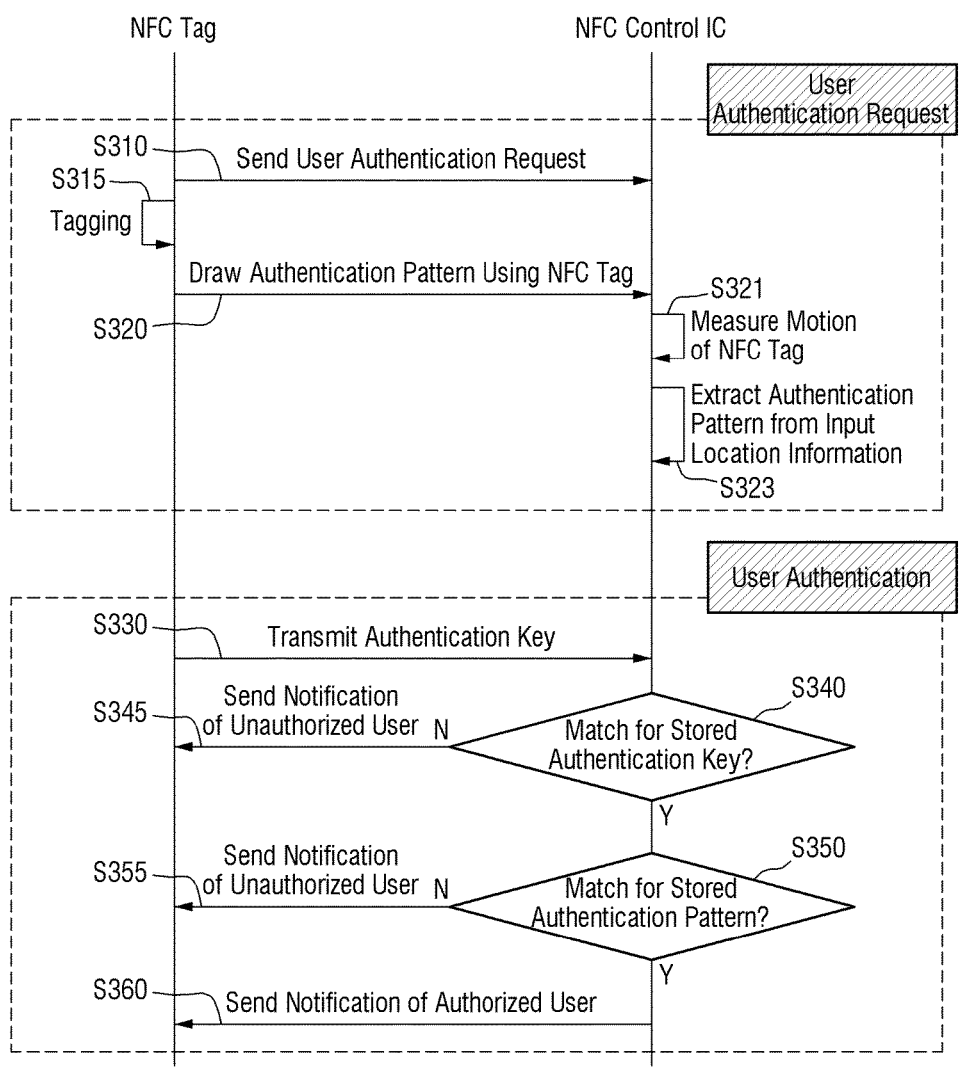
FIG. 7 is a flowchart illustrating an authentication process, using an authentication pattern, of an NFC tag-based recognition system according to an example of the inventive concept.

FIG. 7 is a flowchart illustrating an authentication process, using an authentication pattern, of an NFC tag-based recognition system according to an example of the inventive concept.

Referring to FIG. 7, in a case in which a user attempts to access (a device having) a lock connected to an NFC tag recognition device 1000 (for example, to send a request to lock or unlock the lock device), the user transmits an authentication request by tagging an NFC tag 400 in the NFC tag recognition device 1000 (S310).

Subsequently, the NFC tag 400 is manipulated to draw an authentication pattern over the NFC tag recognition device 1000 (S320) while still being tagged in the NFC tag recognition device 1000 (S315).

Subsequently, an NFC control IC 100 calculates the location of the NFC tag 400 and the amount of variation in the location of the NFC tag 400 based on a signal received from the NFC tag 400 and generates an authentication pattern of the user based on the results of the calculation (S323).

The NFC tag 400 transmits an authentication key of the user to the NFC control IC 100 in the process of being tagged in the NFC tag recognition device 1000 (S330).

Subsequently, the NFC control IC 100 determines whether the authentication key transmitted by the NFC tag 400 matches an authentication key stored in an authentication signal storage 140 (S340).

If the authentication key transmitted by the NFC tag 400 does not match the authentication key stored in the authentication signal storage 140, the NFC control IC 100 transmits a response signal indicating that the user is not an authorized user to the NFC tag 400 (S345).

On the other hand, if the authentication key transmitted by the NFC tag 400 matches the authentication key stored in the authentication signal storage 140, the NFC control IC 100 determines whether the generated authentication pattern matches an authentication pattern stored in the authentication signal storage 140 (S350).

If the generated authentication pattern does not match the authentication pattern stored in the authentication signal storage 140, the NFC control IC 100 transmits a response signal indicating that the user is not an authorized user to the NFC tag 400 (S355).

On the other hand, if the generated authentication pattern matches the authentication pattern stored in the authentication signal storage 140, the NFC control IC 100 transmits a response signal indicating that the user is an authorized user to the NFC tag 400 and allocates a right to access (the device having) the lock to the NFC tag 400.

For example, the NFC control IC 100 may generate an authorization grant signal and may transmit the authorization grant signal to the NFC tag 400 or (the device having) the lock, and as a result, the NFC tag 400 may be able to open the lock (and thereby access the device).

Figure 8:
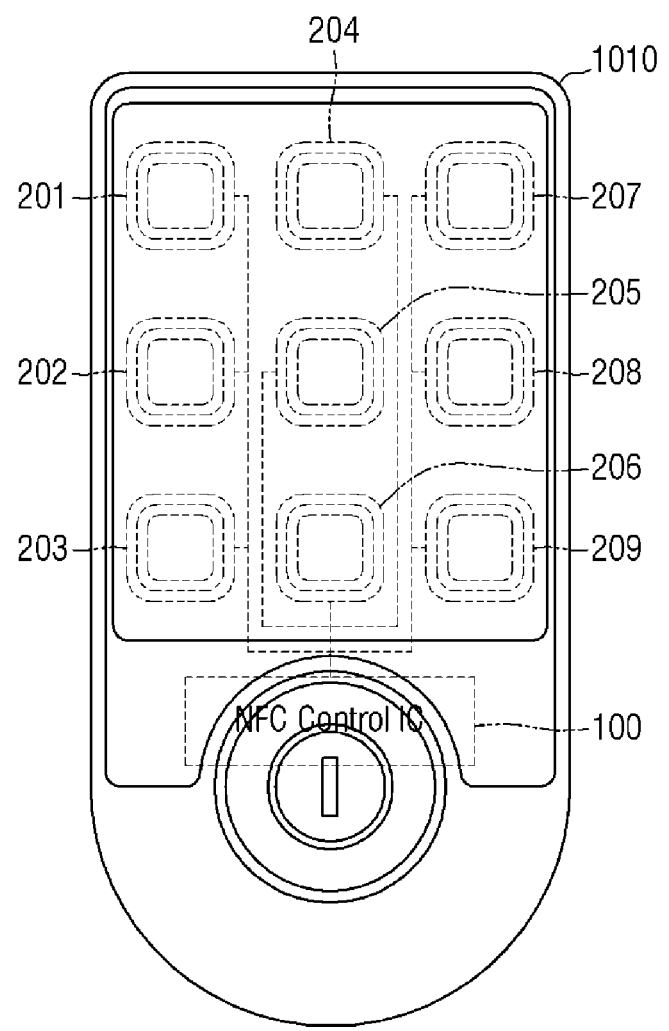
FIG. 8 is a schematic diagram of a lock including an NFC tag recognition device according to an example of the inventive concept.
Figure 9:
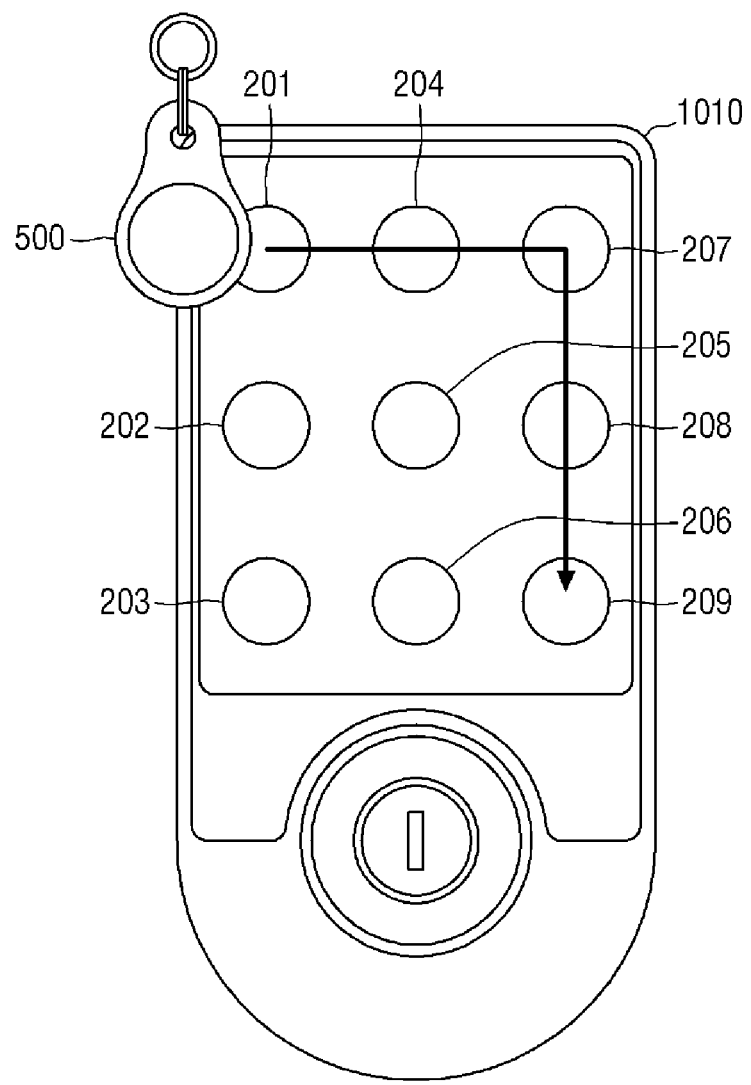
FIG. 9 is a conceptual diagram illustrating an operation of the lock including the NFC tag recognition device according to the example of FIG. 8.

FIG. 8 is a schematic view illustrating a unit comprising an NFC tag recognition device according to an example of the inventive concept. In this example, the unit may include a lock. In other words, the NFC tag recognition device and lock may be provided together in the same unit, i.e. may be integrated. FIG. 9 is a schematic view illustrating an operation of the unit of the example of FIG. 8.

Referring to FIGS. 8 and 9, an NFC tag recognition device 1010 includes an NFC control IC 100 and a plurality of antennas 201 through 209. The NFC control IC 100 may operate substantially in the same manner as the example of FIG. 1.

The antennas 201 through 209 may be arranged in a grid and may have the form of dots of a lock pattern, but the inventive concept is not limited thereto.

In a case in which an NFC electronic device 500 including an NFC tag is placed over the antennas 201 through 209, the NFC control IC 100 may determine which of the antennas 201 through 209 is closest to the NFC electronic device 500.

By using the antennas 201 through 209, the NFC control IC 100 may compute the motion of the NFC electronic device 500 and may generate an authentication pattern based on the result of calculations performed in the computation of the motion. Subsequently, the NFC control IC 100 may compare the generated authentication pattern with an authentication pattern previously stored in the NFC control IC 100. Also, the NFC control IC 100 may compare, through data communication, an authentication key of the NFC electronic device 500 with an authentication key previously stored in the NFC control IC 100.

If the authentication key and the authentication pattern of the NFC electronic device 500 match the authentication key and the authentication pattern, respectively, previously stored in the NFC control IC 100, the NFC control IC 100 may unlock a lock of the unit including the NFC tag recognition device 1010, i.e., may grant the user of the device 500 a right to use a device or a right to access a mechanism that had been locked by the unit comprising the NFC tag recognition device 1010.

Figure 10:
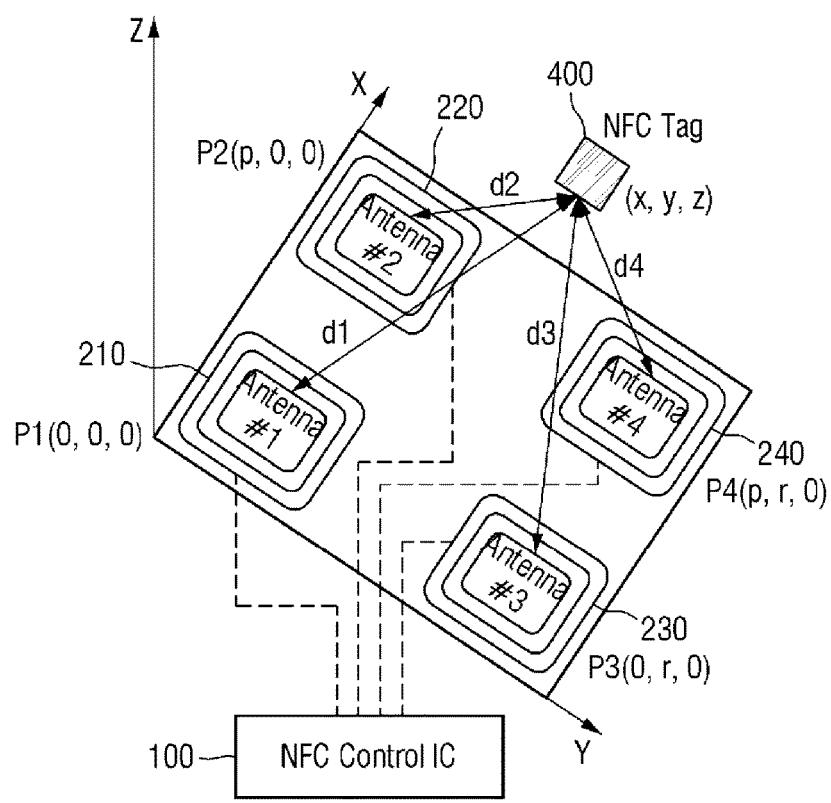
FIG. 10 is a conceptual diagram illustrating an operation of an NFC tag-based recognition system according to an example of the inventive concept.
Figure 11:
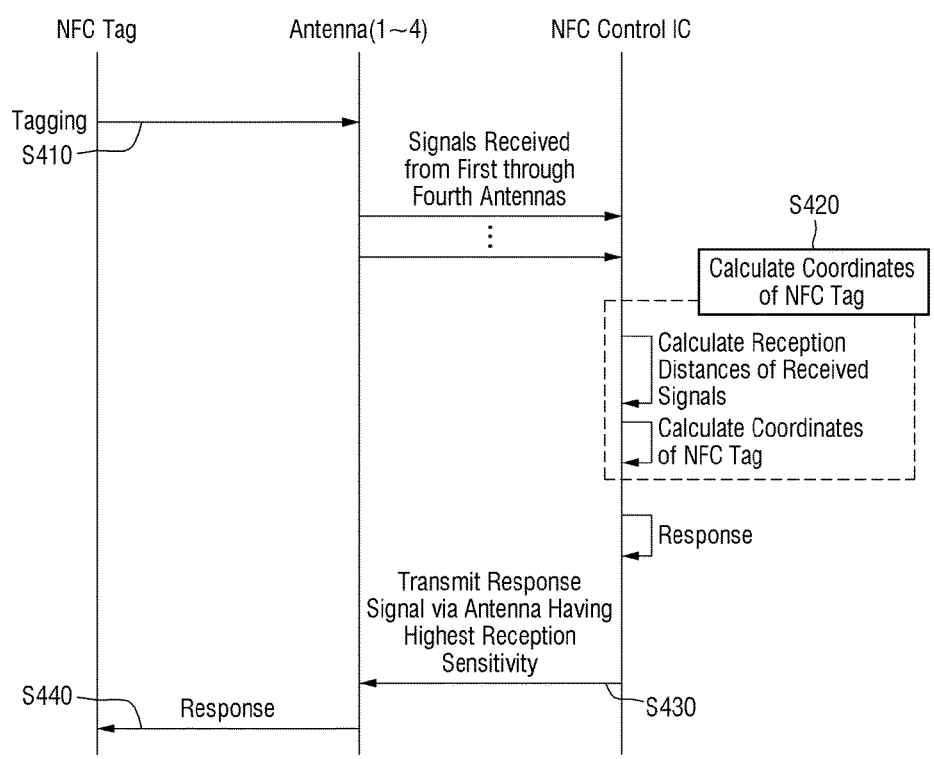
FIG. 11 is a flowchart illustrating a method of generating 3D location information of an NFC tag in the NFC tag-based recognition system according to the example of FIG. 10.

FIG. 10 illustrates principles of operation of an NFC tag-based recognition system according to an example of the inventive concept. FIG. 11 is a flowchart illustrating a method of measuring 3D location information of an NFC tag in the example of the NFC tag-based recognition system of FIG. 10.

Referring to FIGS. 10 and 11, the NFC tag-based recognition system according to the present example may include an NFC control IC 100, a plurality of antennas (210, 220, 230, and 240), and an NFC tag 400. The NFC control IC 100 and the antennas (210, 220, 230, and 240) may operate substantially in the same manners as their respective counterparts of the example of FIG. 1.

For convenience, four antennas, i.e., first, second, third, and fourth antennas 210, 220, 230, and 240, are illustrated in FIGS. 10 and 11, but the inventive concept is not limited thereto. That is, the NFC tag-based recognition system according to the present example may use less than or more than four antennas (for example, three, six, or nine antennas).

The NFC tag-based recognition system according to the present example may calculate the location of the NFC tag 400 in a 3D space by using the first, second, third, and fourth antennas 210, 220, 230, and 240.

More specifically, the NFC control IC 100 receives signals from the first, second, third, and fourth antennas 210, 220, 230, and 240. The received signals may have different powers.

An RF signal processor 110 of the NFC control IC 100 may measure first, second, third, and fourth reception sensitivities of the first, second, third, and fourth antennas 210, 220, 230, and 240, for a signal issued by the NFC tag 400.

An authentication signal processor 130 of the NFC control IC 100 may compute the location of the NFC tag 400 and changes in the location of the NFC tag 400 based on the measured first through fourth reception sensitivities. More specifically, by using the measured first through fourth reception sensitivities, the authentication signal processor 130 may calculate a first distance d1 between the NFC tag 400 and the first antenna 210, a second distance d2 between the NFC tag 400 and the second antenna 220, a third distance d3 between the NFC tag 400 and the third antenna 230, and a fourth distance d4 between the NFC tag 400 and the fourth antenna 240.

Subsequently, the authentication signal processor 130 may calculate the x-, y-, and z-axis coordinates of the NFC tag 400 based on three of the first through fourth distances d1 through d4, e.g., the first through third distances d1 through d3, as shown in Equation (1):

$$x = \frac{d1^2 - d2^2 + p^2}{2p}, \; y = \frac{d1^2 - d3^2 + r^2}{2r}, \; z = \sqrt{d_1^2 - x^2 - y^2}. \quad (1)$$

wherein the location of the first antenna 210 is (0, 0, 0), the location of the second antenna 220 is (p, 0, 0), the location of the third antenna 230 is (0, r, 0), the location of the fourth antenna 240 is (p, r, 0), and d1, d2, d3, and d4 are the distances between the NFC tag 400 and the first through fourth antennas 210, 220, 230, and 240, respectively. Here, the term "location" of course refers to a location within a Cartesian coordinate system whose origin lies on the first antenna 210.

Referring to FIG. 11, in response to the NFC tag 400 accessing (i.e., tagged in by) an NFC tag recognition device including the NFC control IC 100 and the first, second, third, and fourth antennas 210, 220, 230, and 240, each of the first, second, third, and fourth antennas 210, 220, 230, and 240 receives an NFC signal (S410). Each of the first, second, third, and fourth antennas 210, 220, 230, and 240 transmits the received NFC signal to the NFC control IC 100.

Subsequently, the NFC control IC 100 calculates a first set of coordinates of the NFC tag 400 based on NFC signals received at a time t1 via the first, second, third, and fourth antennas 210, 220, 230, and 240 (S420). More specifically, the RF signal processor 110 of the NFC control IC 100 measures the received powers of the NFC signals received at the time t1 via the first, second, third, and fourth antennas 210, 220, 230, and 240. The authentication signal processor 130 calculates the first set of coordinates of the NFC tag 400 based on the measured received powers. The NFC control IC 100 may receive data from the NFC tag 400.

Subsequently, the NFC control IC 100 may transmit a response signal for the received data by using whichever of the first, second, third, and fourth antennas 210, 220, 230, and 240 is determined, based on the measured received powers, to have a highest reception sensitivity (S430 and S440).

Although not specifically illustrated in FIGS. 10 and 11, the NFC control IC 100 may compute magnitude in changes in the location of the NFC tag 400 from the coordinates of the NFC tag 400 calculated in real time or periodically. The NFC control IC 100 may generate a motion pattern in a 3D space based on the amount of changes in the location of the NFC tag 400. The motion pattern may be used as an authentication pattern, but the inventive concept is not limited thereto.

For example, a 3D authentication pattern computed by the NFC control IC 100 may be used to attain a right to access some contrivance, integrated with the NFC tag recognition device, substantially in the same manner as in the previous examples.

More specifically, the NFC control IC 100 may determine whether to allow the NFC tag 400 to access a locked device by comparing an authentication pattern of the NFC tag 400, including 3D location information, with an authentication pattern stored in advance in the NFC tag recognition device, and by comparing an authentication key of the NFC tag 400 with an authentication key stored in advance in the NFC tag recognition device, but the inventive concept is not limited thereto. That is, the authentication pattern of the NFC tag 400, but not the authentication key of the NFC tag 400, may be used to determine whether to allow access to the locked device, or vice versa.

Figure 12:
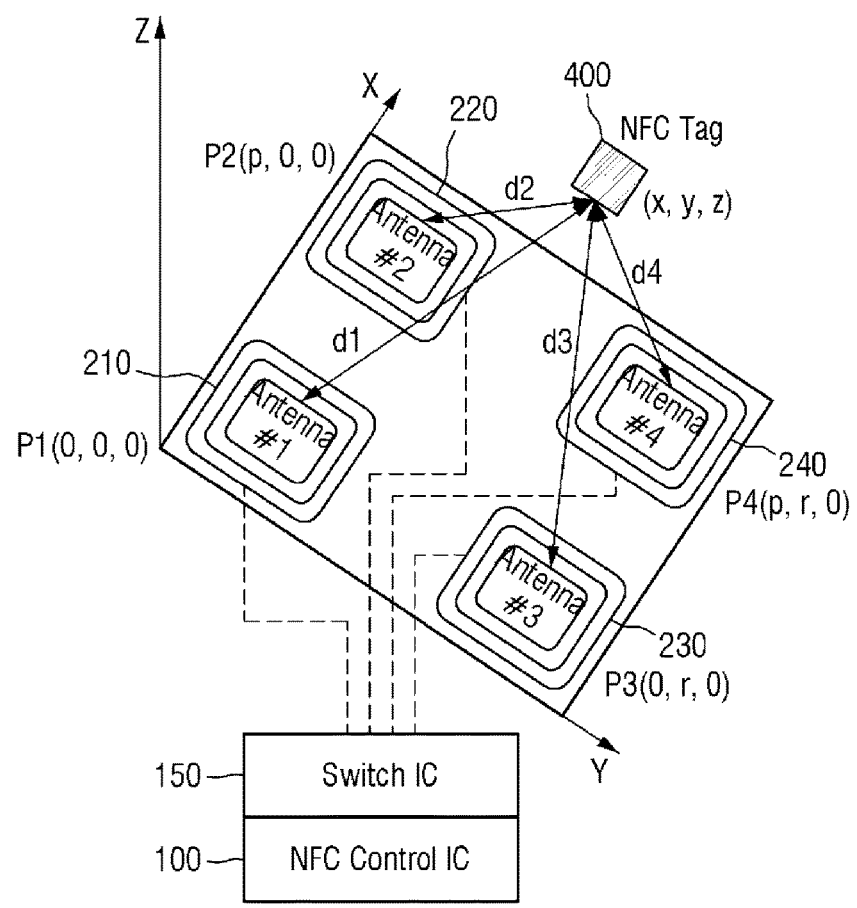
FIG. 12 is a conceptual diagram illustrating an operation of an NFC tag-based recognition system according to an example of the inventive concept.

FIG. 12 illustrates principles of an operation of an NFC tag-based recognition system according to an example of the inventive concept.

Referring to FIG. 12, the NFC tag-based recognition system according to the present example includes an NFC control IC 100, a switch IC 150, a plurality of antennas (210, 220, 230, and 240), and an NFC tag 400. The NFC control IC 100 and the switch IC 150 may operate substantially in the same manners as their respective counterparts of the example of FIG. 3.

The NFC tag-based recognition system according to the present example includes, for example, four antennas, i.e., first, second, third, and fourth antennas 210, 220, 230, and 240. The NFC control IC 100 may either sequentially receive signals or receive time-divided signals from the first, second, third, and fourth antennas 210, 220, 230, and 240, but the inventive concept is not limited thereto.

Because the NFC control IC 100 of this example is not capable of simultaneously processing multiple signals received via the first, second, third, and fourth antennas 210, 220, 230, and 240, the NFC control IC 100 may process the received signals either sequentially or in a time-division manner by using the switch IC 150.

Times at which the signals received via the first, second, third, and fourth antennas 210, 220, 230, and 240 may differ. To minimize the effect of any time differences among the signals received via the first, second, third, and fourth antennas 210, 220, 230, and 240, the NFC control IC 100 calculates a first set of coordinates of the NFC tag 400 based on the signals received via the first, second, and antennas 210, 220, and 230, and calculates a second set of coordinates of the NFC tag 400 based on the signals received via the first, second, and fourth antennas 210, 220, and 240.

Subsequently, the NFC control IC 100 may calculate the location of the NFC tag 400 based on an average set of coordinates (x, y, z) obtained by averaging the first and second sets of coordinates, as shown in Equation (2):

$$x = \frac{d1^2 - d2^2 + d3^2 - d4^2 + 2p^2}{4p}$$
$$y = \frac{d1^2 - d3^2 + d2^2 - d4^2 + 2r^2}{4r}$$
$$z = \frac{\sqrt{d_1^2 - X^2 - Y^2} + \sqrt{d_4^2 - X^2 - Y^2}}{2}$$

(2)

wherein the location of the first antenna 210 is (0, 0, 0), the location of the second antenna 220 is (p, 0, 0), the location of the third antenna 230 is (0, r, 0), the location of the fourth antenna 240 is (p, r, 0), and d1, d2, d3, and d4 are the distances between the NFC tag 400 and the first through fourth antennas 210, 220, 230, and 240, respectively. Here, as in the example above, the locations are all relative positions in a Cartesian coordinate system whose origin (reference point) is disposed closer to the first antenna 210 than to any of the other antennas.

Figure 13:
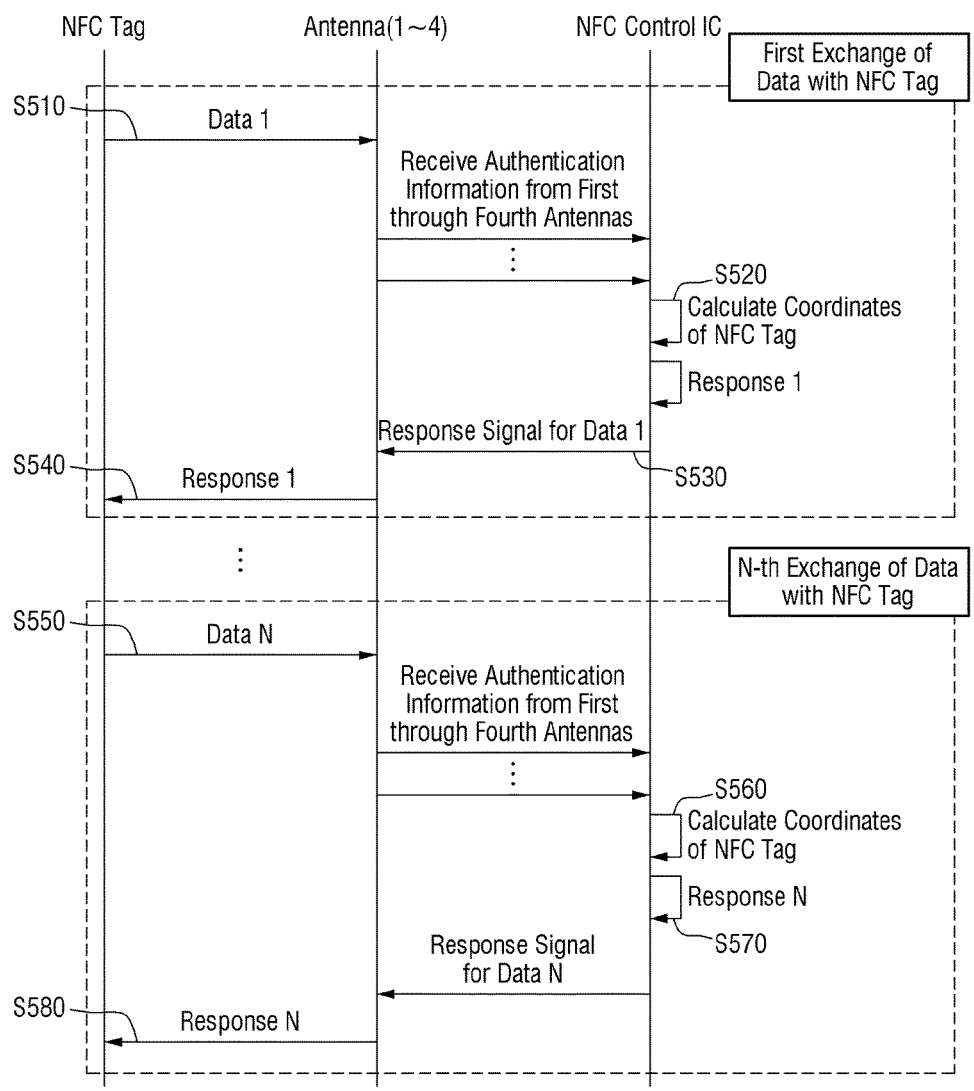
FIG. 13 is a flowchart illustrating methods of generating 3D location information of an NFC tag and exchanging data between an NFC tag recognition device and the NFC tag in an NFC tag-based recognition system according to an example of the inventive concept.

FIG. 13 is a flowchart illustrating a method of generating 3D location information of an NFC tag and exchanging data between an NFC tag recognition device and the NFC tag in an NFC tag-based recognition system according to an example of the inventive concept. For convenience, the present example will hereinafter be described focusing mainly on differences with the previous examples to avoid any redundant descriptions.

Referring to FIG. 13, the NFC tag-based recognition system according to the present example computes the coordinates of an NFC tag 400 and at the same time, allows an NFC control IC 100 and the NFC tag 400 to exchange data. Data communication between the NFC control IC 100 and the NFC tag 400 may be performed in real time or periodically.

The processes represented by steps S510, S520, S530, and S540 of FIG. 13 are substantially the same as S410, S420, S430, and S440, respectively, of FIG. 11. The NFC control IC 100 may calculate the location of the NFC tag 400 and the magnitudes of changes in the location of the NFC tag 400 and at the same time, transmit a response signal for the data received from the NFC tag 400 to the NFC tag 400.

The response signal may be transmitted from the NFC control IC 100 to the NFC tag 400 via whichever of a plurality of antennas 210, 220, 230, and 240 has a highest reception sensitivity. That is, the NFC control IC 100 may transmit a response signal to the NFC tag 400 using an antenna having a highest reception sensitivity.

As illustrated in FIG. 13, the exchange of data between the NFC tag 400 and the NFC control IC 100 may be performed in real time or periodically. Accordingly, steps S550, S560, S570, and S580 may be substantially the same as S510, S520, S530, and S540, respectively, and may be performed repeatedly.

Figure 14:
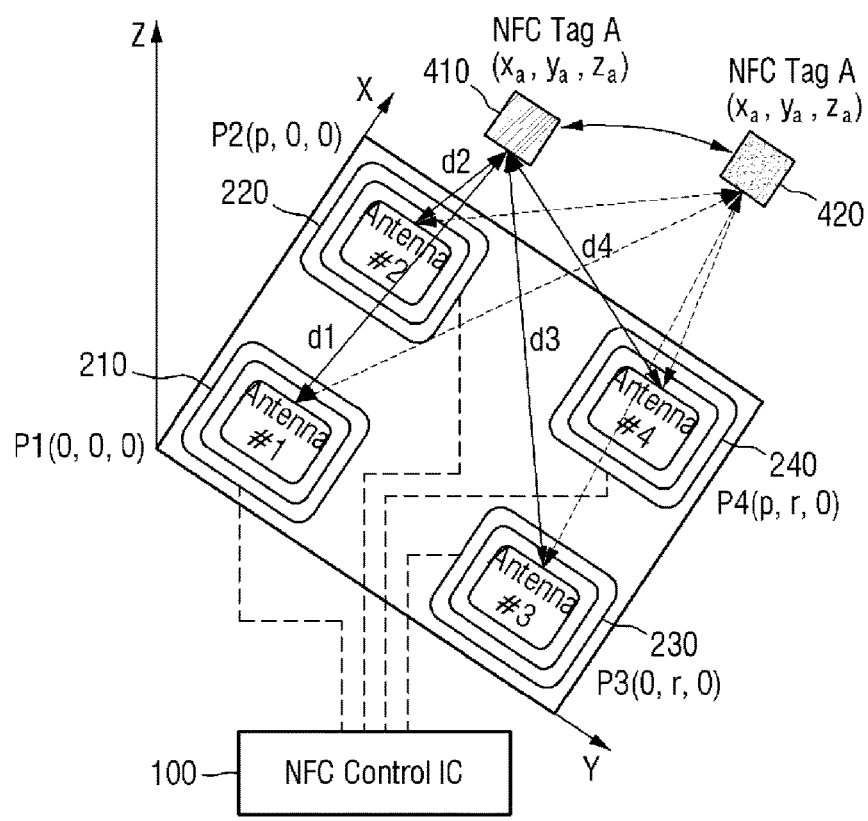
FIG. 14 is a conceptual diagram illustrating a method of generating 3D location information of a plurality of NFC tags in an NFC tag-based recognition system according to an example of the inventive concept.
Figure 15:
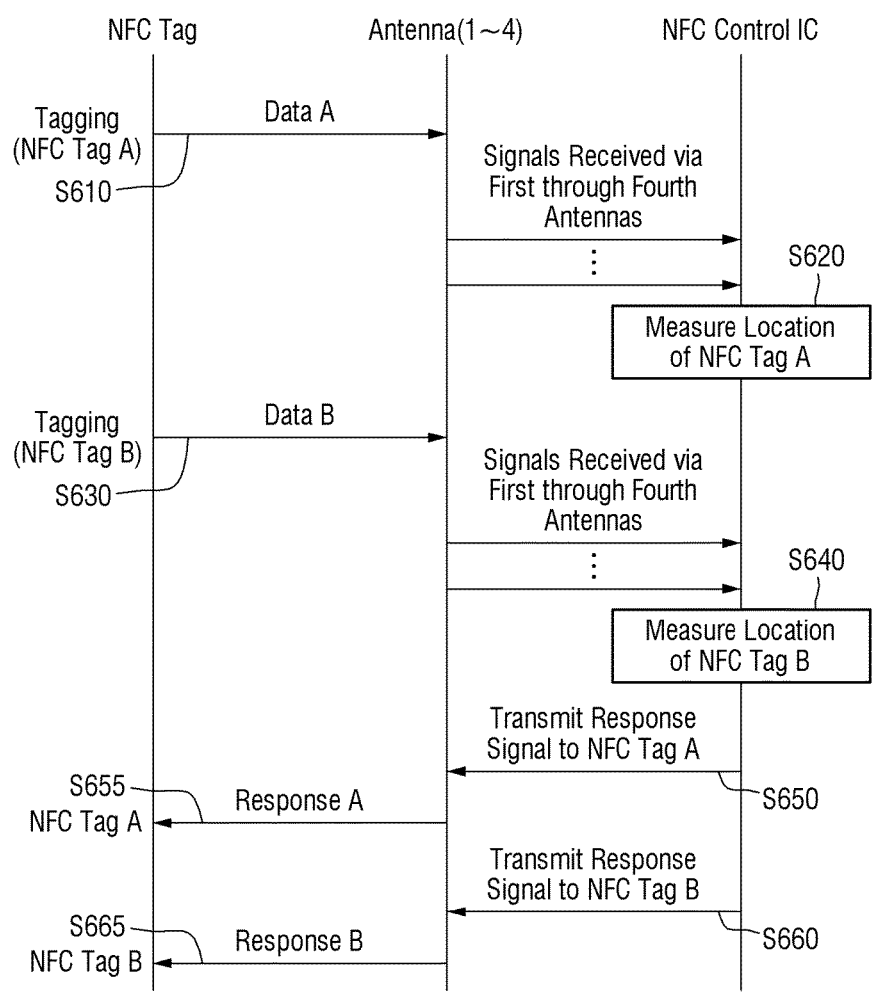
FIG. 15 is a flowchart illustrating a method of simultaneously generating the 3D location of the plurality of NFC tags in the NFC tag-based recognition system according to the example of FIG. 14.

FIG. 14 illustrates a method of generating 3D location information of a plurality of NFC tags in an NFC tag-based recognition system according to an example of the inventive concept. FIG. 15 is a flowchart illustrating a method of simultaneously generating the 3D locations of the plurality of NFC tags in the NFC tag-based recognition system of the example of FIG. 14.

Referring to FIGS. 14 and 15, the NFC tag-based recognition system according to the present example may compute the locations of first and second NFC tags 410 and 420 at the same time. The first and second NFC tags 410 and 420 may have different RF attributes.

More specifically, the NFC tag-based recognition system according to the present example may compute the coordinates of the first NFC tag 410 by measuring the distances between the first NFC tag 410 and a plurality of antennas 210, 220, 230, and 240 based on an NFC signal received from the first NFC tag 410. Simultaneously, the NFC tag-based recognition system according to the present example may compute the coordinates of the second NFC tag 420 by measuring the distances between the second NFC tag 420 and the antennas 210, 220, 230, and 240 based on an NFC signal received from the second NFC tag 420.

The first and second NFC tags 410 and 420 may transmit signals to an NFC tag recognition device by using different RF attributes, i.e., different frequency patterns. The NFC tag recognition device may continue to switch from one RF attribute to another RF attribute at regular intervals of time to search for signals. Accordingly, the first and second NFC tags 410 and 420 may transmit signals to the NFC control IC 100 at regular intervals of time, and the NFC control IC 100 may determine the locations of a plurality of NFC tags having different RF attributes and the changes in the locations of the plurality of NFC tags in each cycle.

Thus, the NFC tag-based recognition system according to the present example may measure the locations of the first and second NFC tags 410 and 420 at the same time. As a result, the NFC tag-based recognition system according to the present example may establish coordinates of each of the first and second NFC tags 410 and 420 at the same time and may be used to scale up or down, or copy, images in a smart device (such as a smartphone, a VR device, or an AR device).

FIGS. 16 through 19 illustrate examples of the application of an NFC tag-based recognition system to various electronic devices according to the inventive concept.

Figure 16:
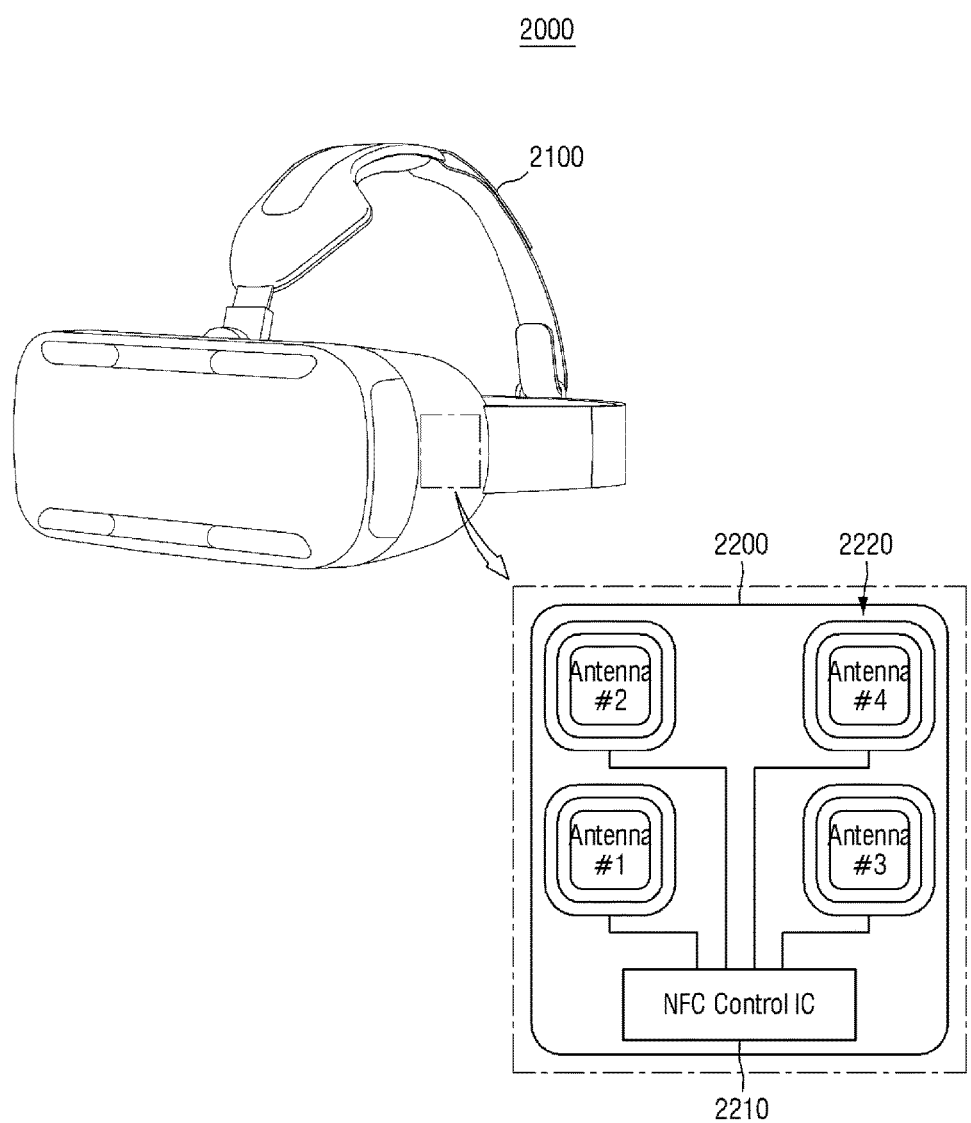
FIGS. 16, 17, 18 and 19 are schematic diagrams illustrating examples of systems including various electronic devices and an example of an NFC tag-based recognition system applied to the devices, according to the inventive concept.

More specifically, referring to FIG. 16, an NFC tag-based recognition system according to the inventive concept may be used in a VR system 2000 (or an AR system). For example, an NFC tag recognition device 2200 may be disposed on one side of a VR module 2100. The NFC tag-based recognition system 2200 may operate substantially in the same manner as the NFC tag recognition device 1000.

A user may use a controller, which includes one or more NFC tags, in a VR as a pointer by manipulating the controller over the VR module 2100 having the NFC tag recognition device 2200 embedded therein.

Figure 17:
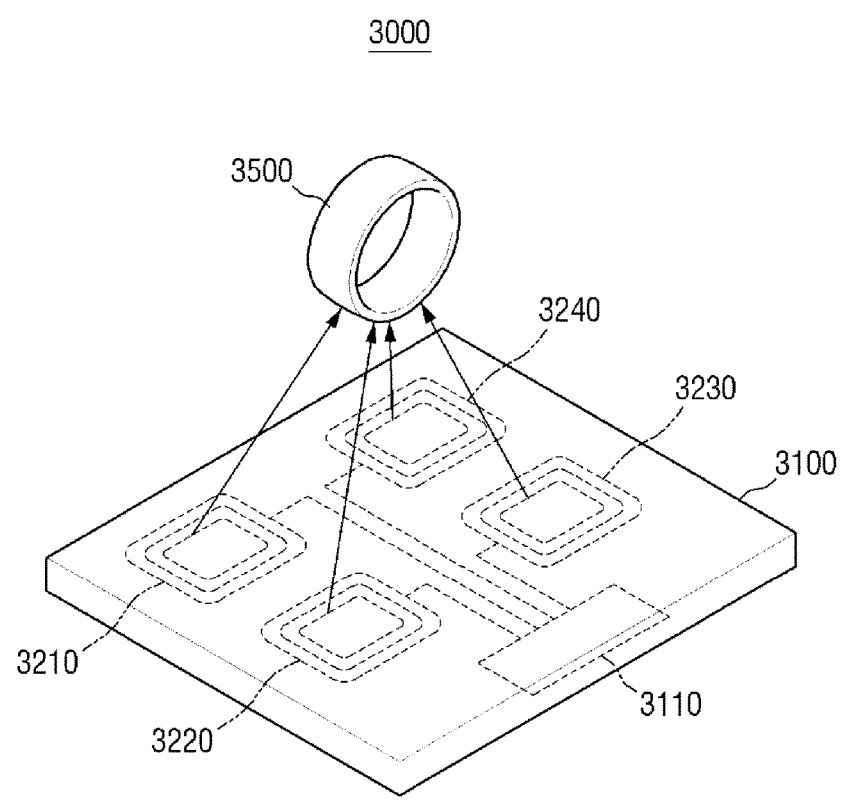

Referring to FIG. 17, the NFC tag-based recognition system according to some examples of the inventive concept may be used in a 3D controller 3000.

The 3D controller 3000 may include a controller pad 3100, which includes an NFC control IC 3110 and a plurality of antennas 3210, 3220, 3230, and 3240, and a control device 3500, which includes an NFC tag. The controller pad 3100 may operate substantially in the same manner as the NFC tag recognition device 1000.

In a case in which the control device 3500 moves over the controller pad 3100, the controller pad 3100 may detect the motion of the control device 3500 and may transmit the result of the detection to an electronic device connected thereto in a wired or wireless manner (for example, WiFi or Bluetooth).

Figure 18:
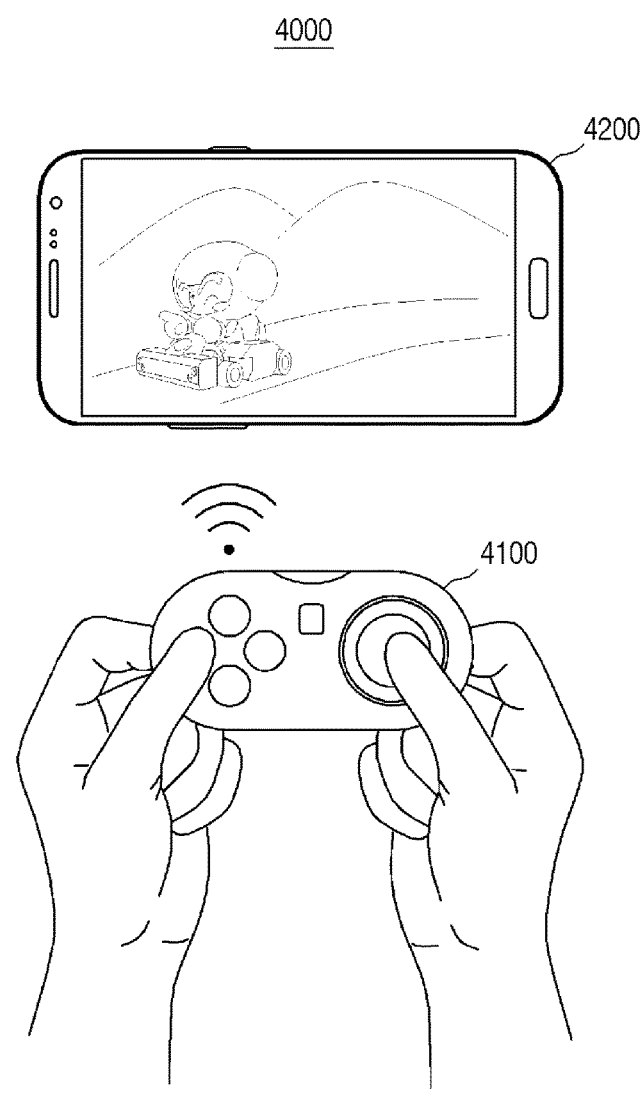

Referring to FIG. 18, an NFC tag-based recognition system according to the inventive concept may be used in a mobile terminal control system 4000.

The mobile terminal control system 4000 may include a controller 4100, which includes an NFC tag, and a mobile terminal 4200 (for example, a mobile phone). The mobile terminal 4200 may include the NFC tag recognition device 1000. The mobile terminal 4200 may receive 3D location information of the controller 4100. The mobile terminal 4200 may perform near-field data communication with the controller 4100.

Figure 19:
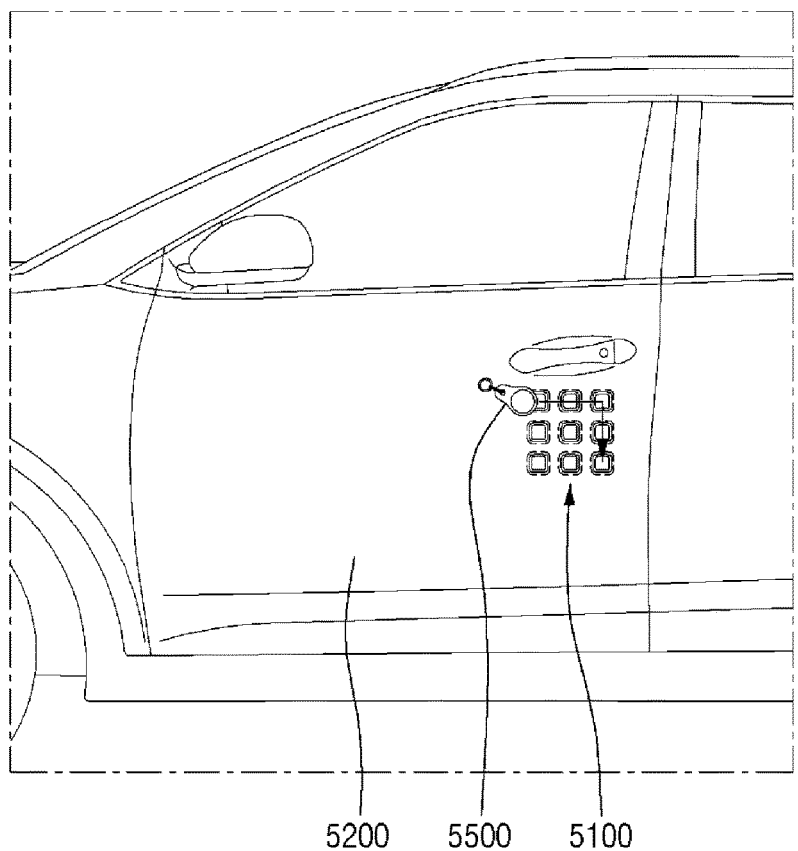

Referring to FIG. 19, an NFC tag-based recognition system according to the inventive concept may be used, in a vehicle door lock system 5000. Here, the vehicle door lock system is an another example of a control system that employs an NFC tag-based recognition system, according to the inventive concept. The vehicle door lock system 5000 includes an NFC tag recognition device 5100, which is embedded in one side of a door 5200 of a vehicle along with an electronically controllable lock integrated with the door handle (shown by not numbered in the figure), and a vehicle key 5500 which includes an NFC tag. The NFC tag recognition device 5100 may operate substantially in the same manner as the NFC tag recognition device 1000. The NFC tag-based recognition system according to the inventive concept is not only applicable to a vehicle door lock system, but also applicable to nearly all devices or products having an electronically controllable lock capable of assuming a locked state in which the device or product is inaccessible to a user and an unlocked state in which the device or product is accessible to a user.

Finally, examples of the inventive concept have been described above in detail. The inventive concept may, however, be put into practice in many different ways and should not be construed as being limited to the examples described above. Rather, these examples were described so that this disclosure is thorough and complete, and fully conveys the inventive concept to those skilled in the art. Thus, the true spirit and scope of the inventive concept is not limited by the examples described above but by the following claims.

What is claimed is:

1. A near-field communication (NFC) tag recognition device, comprising:
   at least one antenna;
   a radio frequency (RF) signal processor operatively connected to the at least one antenna and configured to measure power of an RF signal received by the at least one antenna from an external device comprising an NFC tag and convert the RF signal into digital data containing information of power measurements of the RF signal received from the at least one antenna;

an NFC controller operatively connected to the RF signal processor and configured to extract an authentication key from the digital data generated by the RF signal processor;

an authentication signal processor configured to generate data of an authentication pattern, describing motion of the NFC tag relative to the at least one antenna, by calculating once the NFC tag is within a given field of proximity to the at least one antenna a distance between the NFC tag and a reference point fixed relative to the at least one antenna and changes in the distance using the information of power measurements in the digital data produced by the RF signal processor; and an authentication signal storage configured to store a user authentication key and data of a user authentication pattern of a user, and wherein the authentication signal processor is operatively connected to the authentication signal storage such that the user authentication key and the data of the user authentication pattern stored in the authentication signal storage are accessible by the authentication signal processor, and the authentication signal processor is configured to compare the user authentication key extracted by the NFC controller with the user authentication key stored in the authentication signal storage, to compare the data of the authentication pattern generated by the authentication signal processor with data of an authentication pattern stored in the authentication signal storage, and to generate an authorization grant signal in response to, at a minimum, both the authentication key extracted by the NFC controller matching the user authentication key stored in the authentication signal storage and the data of the authentication pattern generated by the authentication signal processor corresponding to the data of the user authentication pattern stored in the authentication signal storage.

2. The NFC tag recognition device of claim 1, wherein the RF signal processor measures the power of the RF signal received by the at least one antenna in real time, and
the authentication signal processor is configured to calculate a first distance between the reference point and the NFC tag using power measured by the RF signal processor at a first point in time, to calculate a second distance between the reference point and the NFC tag using power measured by the RF signal processor at a second point in time after the first point in time, and to generate the data of the authentication pattern using time period between the first and second points in time and a difference between the first and second distances.

3. The NFC tag recognition device of claim 1, wherein the authentication signal processor is configured to generate a new authentication key in response to a user registration request signal being received by the at least one antenna from the external device of the RF signal, the NFC controller is operative to control the authentication signal storage to store the new authentication key when generated by the authentication signal processor, and the RF signal processor is operative to control the at least one antenna to transmit the new authentication key when it is generated.

4. The NFC tag recognition device of claim 3, wherein the NFC controller is operative to control the NFC tag recognition device to send a request for inputting data of a new authentication pattern to the external device comprising the NFC tag when a signal indicating that the new authentication key is stored in the external device is received from the external device, the authentication signal processor is configured to generate data of the new authentication pattern by calculating changes in the distance between the reference point and the NFC tag occurring after the request, and the NFC controller is operative to control the authentication signal storage to store the data of the generated new authentication pattern.

5. The NFC tag recognition device of claim 1, wherein the authentication signal processor is configured to generate an authorization non-grant signal in response to the authentication key not matching the user authentication key and the data of the authentication pattern not corresponding to the data of the user authentication pattern.

6. The NFC tag recognition device of claim 1, wherein the at least one antenna of the NFC tag recognition device includes first, second and third discrete antennas each operatively connected to the RF signal processor,
the RF signal processor is configured to measure reception sensitivities of the first, second and third antennas, respectively, to a signal from each said at least one NFC tag, and
the authentication signal processor is configured to compute a spatial location of each said at least one NFC tag and changes in the spatial location of each said at least one NFC tag using the measured reception sensitivities.

7. The NFC tag recognition device of claim 6, wherein the authentication signal processor is configured to calculate a distance between the NFC tag and the first antenna, a distance between the NFC tag and the second antenna, and a distance between the NFC tag and the third antenna using the measured first through third reception sensitivities, and based on the calculated distances to compute x-, y-, and z-axis coordinates of the NFC tag in a Cartesian coordinate system whose origin is the reference point.

8. The NFC tag recognition device of claim 6, wherein the RF signal processor is configured to measure the power of the RF signal in real time, and
the authentication signal processor is configured to use the information of the power measurements to compute a spatial first location of the NFC at a first point in time, to compute a spatial second location of the NFC tag at a second point of time after the first point in time, and to generate the data of the authentication pattern using time period between the first and second points in time and a spatial difference between the spatial first and second locations.

9. The NFC tag recognition device of claim 6, wherein the NFC controller is configured to generate a response signal for the digital data and transmit the response signal to the NFC tag via whichever of the first, second and third antennas has a highest reception sensitivity to the RF signal emitted by the external device comprising the NFC tag.

10. The NFC tag recognition device of claim 6, wherein at least one antenna is responsive at the same time to the RF signals emitted by first and second NFC tags,
the authentication signal processor is configured to compute spatial locations of the first NFC tag relative to the NFC tag recognition device and changes in the spatial locations of the first NFC tag relative to the NFC tag recognition device, and to compute spatial locations of the second NFC tag relative to the NFC tag recognition device and changes in the spatial locations of the second NFC tag relative to the NFC tag recognition device, and
the NFC controller is operative to execute operations of the NFC tag recognition device in which a first response signal is transmitted by the NFC tag recognition device to the first NFC tag and a second response signal is transmitted by the NFC tag recognition device to the second NFC tag.

11. The NFC tag recognition device of claim 10, wherein the first and second NFC tags have different RF attributes.

12. The NFC tag recognition device of claim 1, wherein the at least one antenna comprises first, second, third and fourth discrete antennas each operatively connected to the RF signal processor.

13. A near-field communication (NFC) tag-based recognition system, comprising:
   at least one NFC tag that emits a radio frequency (RF) signal; and
   an NFC tag recognition device configured to generate data of an authentication pattern by computing changes in locations of each said at least one NFC tag relative to the NFC tag recognition device,
   wherein the NFC tag recognition device includes at least one antenna responsive to the RF signal emitted by each said at least one NFC tag,
   a radio frequency (RF) signal processor operatively connected to the at least one antenna and configured to measure power of the RF signal received by each said at least one antenna from said at least one NFC tag and convert the RF signal into digital data containing power measurements of the RF signal received from the at least one antenna,
   an NFC controller operatively connected to the RF signal processor and configured to generate a response signal based on the digital data generated by the RF signal processor,
   an authentication signal processor operatively connected to the RF signal processor and configured to generate data of an authentication pattern, describing motion of the NFC tag relative to the at least one antenna, by calculating once the NFC tag is within a given field of proximity to the at least one antenna a distance between a reference point fixed relative to the at least one antenna and each said at least one NFC tag and changes in the distance between the reference point and each said at least one NFC tag using information of power measurements in the digital data produced by the RF signal processor,
   an authentication signal storage configured to store data of user authentication pattern, and
   a system controller operatively connected to the authentication signal processor to generate a control signal when an authorization grant signal is generated by the authentication signal processor,
   wherein the authentication signal processor is operatively connected to the authentication signal storage such that the data user authentication pattern stored in the authentication signal storage is accessible by the authentication signal processor, and
   the authentication signal processor is configured to compare the data of the authentication pattern generated by the authentication signal processor with data of the user authentication pattern stored in the authentication signal storage and is operative to generate the authorization grant signal in response to, at a minimum, the data of the authentication pattern generated by the authentication signal processor corresponding to the data of the user authentication pattern stored in the authentication signal storage.

14. The NFC tag-based recognition system of claim 13, wherein the at least one antenna of the NFC tag recognition device includes first, second and third discrete antennas each operatively connected to the RF signal processor,
   the RF signal processor is configured to measure reception sensitivities of the first, second and third antennas, respectively, to a signal from each said at least one NFC tag, and
   the authentication signal processor is configured to calculate a spatial location of each said at least one NFC tag and changes in the spatial location of each said at least one NFC tag using the measured reception sensitivities.

15. The NFC tag-based recognition system of claim 13, wherein the at least one antenna comprises a plurality of discrete antennas each operatively connected to the RF signal processor,
   the NFC tag includes first and second NFC tags each emitting a respective RF signal, and
   each of the plurality of antennas is responsive at the same time to the RF signals emitted by the first and second NFC tags,
   the authentication signal processor is configured to compute spatial locations of the first NFC tag relative to the NFC tag recognition device and changes in the spatial locations of the first NFC tag relative to the NFC tag recognition device, and to compute spatial locations of the second NFC tag relative to the NFC tag recognition device and changes in the spatial locations of the second NFC tag relative to the NFC tag recognition device, and
   the NFC controller is operative to execute operations of the NFC tag recognition device in which a first response signal is transmitted by the NFC tag recognition device to the first NFC tag and a second response signal is transmitted by the NFC tag recognition device to the second NFC tag.

16. The NFC tag-based recognition system of claim 15, wherein the first and second NFC tags have different RF attributes.

17. A near-field communication (NFC) control system, comprising:
   at least one NFC tag that emits a radio frequency (RF) signal;
   a device or product including a lock capable of assuming a locked state in which the device or product is inaccessible to a user and an unlocked state in which the device or product is accessible to the user;
   at least one antenna responsive to the RF signal emitted by each said at least one NFC tag;
   a radio frequency (RF) signal processor operatively connected to the at least one antenna and configured to measure strength of the RF signal received by each said at least one antenna from said at least one NFC tag and convert the RF signal into digital data representative of the measured strength;
   an NFC controller operatively connected to the RF signal processor and configured to generate a response signal based on the digital data generated by the RF signal processor;
   an authentication signal processor operatively connected to the RF signal processor to receive the digital data representative of the measured strength, configured to use the digital data representative of the measured strength to generate data of an authentication pattern representative of relative motion between each said at least one NFC tag and the at least one antenna once the NFC tag is within a given field of proximity to the at least one antenna, and operative to generate an authorization signal;

an authentication signal storage configured to store data of a user authentication pattern; and a system controller operatively connected to the authentication signal processor to generate a lock control signal when the authorization signal is generated by the authentication signal processor, and wherein the authentication signal processor is operatively connected to the authentication signal storage such that the data of the user authentication pattern stored in the authentication signal storage is accessible by the authentication signal processor, the authentication signal processor is configured to compare the data of the authentication pattern generated by the authentication signal processor with the data of an authentication pattern stored in the authentication signal storage and is operative to generate the authorization signal in response to, at a minimum, the data of the user authentication pattern generated by the authentication signal processor corresponding to the data of the authentication pattern stored in the authentication signal storage, and the lock is electronically controllable and is operatively connected to the system controller so as to change states from one of the locked and unlocked states to the other of the locked and unlocked states when the system controller generates the lock control signal.

18. The near-field communication (NFC) security system of claim 17, wherein the at least one NFC tag stores an authentication key of the user and is configured to transmit data of the authentication key in the RF signal emitted by the at least one NFC tag, the NFC controller is configured to extract the authentication key of the user from the digital data generated by the RF signal processor;

the authentication signal storage is also configured to store user authentication key accessible by the authentication signal processor, and the authentication signal processor is configured to compare the authentication key of the user extracted from the digital data by the NFC controller with the user authentication key stored in the authentication signal storage, and to generate the authorization signal in response to, at a minimum, both the authentication key of the user extracted by the NFC controller matching the user authentication key stored in the authentication signal storage and the authentication pattern generated by the authentication signal processor corresponding to the user authentication pattern stored in the authentication signal storage.

19. The near-field communication (NFC) control system of claim 17, wherein the at least one antenna consists of a single antenna operatively connected to the RF signal processor, and a reference point lies on the single antenna.

20. The near-field communication (NFC) control system of claim 17, wherein the at least one antenna comprises an array of at least three discrete antennas each operatively connected to the RF signal processor and each responsive to the RF signal emitted by each said at least one NFC tag.

* * * * *